United States Patent [19]

Staley, Jr. et al.

[11] Patent Number: 4,724,224
[45] Date of Patent: Feb. 9, 1988

[54] HIGH DENSITY CHRONIC OXIDE REFRACTORY BLOCK

[75] Inventors: Walter G. Staley, Jr.; Roy R. Ramey, both of Mexico, Mo.

[73] Assignee: A.P. Green Refractories Co., Mexico, Mo.

[21] Appl. No.: 891,661

[22] Filed: Aug. 1, 1986

[51] Int. Cl.$^4$ .............................................. C04B 35/12
[52] U.S. Cl. ...................................... 501/132; 501/133
[58] Field of Search .............................. 501/132, 133

[56] References Cited

U.S. PATENT DOCUMENTS

| | | | |
|---|---|---|---|
| 2,498,622 | 2/1950 | Mochel | 501/132 |
| 3,773,531 | 11/1973 | Manigault | 501/132 |
| 3,971,665 | 7/1976 | Suzuki et al. | 501/132 |
| 4,028,122 | 6/1977 | Greenewald, Jr. | 501/132 |
| 4,028,123 | 6/1977 | Greenewald, Jr. | 501/132 |
| 4,119,472 | 10/1978 | Brashear, Jr. et al. | 106/57 |
| 4,233,079 | 11/1980 | Rechter | 501/132 |
| 4,374,897 | 2/1983 | Yamaguchi | 501/132 |

FOREIGN PATENT DOCUMENTS

| | | | |
|---|---|---|---|
| 23640 | 12/1961 | Japan | 501/132 |
| 239355 | 11/1985 | Japan | 501/132 |

Primary Examiner—William R. Dixon, Jr.
Assistant Examiner—Ellen McAvoy
Attorney, Agent, or Firm—Robert M. Didrick; Robert H. Robinson; Samuel Kurlandsky

[57] ABSTRACT

Large, dense chromic oxide refractory blocks containing from about 80% to about 98% chromic oxide are made by firing a green block comprising, in addition to the chromic oxide, titania and a colloidal silica having a surface area of at least about 90 m$^2$/g. Blocks having porosities as low as 0% are made in either an oxidizing or a reducing atmosphere. The blocks are crack-free and have a good resistance to corrosion by molten glass.

16 Claims, No Drawings

HIGH DENSITY CHRONIC OXIDE REFRACTORY BLOCK

This invention relates to dense refractory blocks having a high chromic oxide content which are used as linings for glass melting furnaces. Large blocks of this kind, typically measuring as large as 6×12×36 inches, tend to crack while being fired during manufacture. The cracking appears to be caused by stresses stemming from non-uniform densification of the refractory during the firing.

Such blocks are formed by methods generally known by those skilled in making various types of ceramic articles. Various types of procedures are known for preparing, mixing, pressing, and drying the raw materials to form an unfired body and then firing the body in a kiln at high temperatures, generally above 2600° F. (1427° C.) but below the melting point of the mixture, to develop a ceramic bonded article. The advantages of the method of this invention are not applicable to fusion casting of refractory shapes.

One method to prevent cracking of the large blocks is to encase them in a substantially air tight muffle during firing. The muffling procedure serves to establish uniform atmospheric and temperature conditions throughout the block so that densification and shrinkage is uniform, thus preventing the formation of damaging stresses. Muffling is an expensive procedure because of the cost of materials and labor in building the muffles and because the muffles occupy space in the kiln, thus reducing the number of blocks which can be fired.

Titanium dioxide, or titania, has long been known as an aid in the densification of high chromic oxide refractory blocks. In U.S. Pat. No. 3,773,531, for example, Manigault teaches that a refractory material comprising from 85 to 98% chromic oxide, from 0.5 to 5% titanium dioxide, and from 1 to 10% zircon possesses very low porosity, high resistance to corrosion by molten glass, and is resistant to thermal cracking during firing.

It is an object of this invention to provide a high chromic oxide refractory material which may be fired in the form of a large block without cracking regardless of whether a reducing or oxidizing atmosphere is present in the kiln.

It is another object of this invention to provide large blocks of high chromic oxide refractory material which have good resistance to corrosion by molten glass.

It is a related object of this invention to provide a method for manufacturing large, dense, high chromic oxide refractory blocks which are consistently free of cracks.

These and other objects of this invention which will become apparent from the following description are achieved by blending a mixture containing, by weight, from about 80 to about 98% of chromic oxide, from about 1 to about 4% by weight of titania, from about 1 to about 3% by weight of a silica having a surface area of about 90 m²/g or greater, from 0% to about 8% alumina, from 0% to about 5% ferric oxide, and from 0% to about 5% magnesia, pressing the blended solids into the desired shape, and firing the pressed shape at a temperature of from about 2600° F. to about 3200° F. (1427°–1760° C.) in a kiln in which the atmosphere may contain from about 1.5% excess combustibles to about 1.5% excess oxygen. A preferred mixture contains about 2% each of titania and the colloid-sized silica.

The chromic oxide preferably has an average particle size greater than 1 micron, more preferably from about 2 to about 10 microns. A technical grade having a purity of about 98.5% $Cr_2O_3$ is suitable. A pigment grade of titania is preferred; either anatase or rutile is satisfactory. A finely divided titania such as that sold under the trademark Titanox 1070 by NL Industries, Inc. exemplifies the material used in this invention.

The silica may be in the form of a sol such as that sold by DuPont under its LUDOX trademark or it may be a dry powder such as CAB-O-SIL fumed silica sold by Cabot Corporation. The average particle diameter of the colloidal silica may be from about 7 to about 24 nm (0.007 to 0.024 micron).

The alumina, ferric oxide, and magnesia, if present, may originate from a low silica chromite, as may some of the chromic oxide. The chromite, which is a chrome iron ore, may constitute up to about 28% of the dry weight of the blended mixture. A representative sample of the ore contained 35.1% $Cr_2O_3$, 28.8% $Al_2O_3$, 15.4% $Fe_2O_3$, 18.8% MgO, 1.8% $SiO_2$ and 0.2% CaO. The silica of the ore does not function like the colloidal silica described above; the average particle size of the ore is preferably from about 3.5 to about 5 microns but it may be from 1 to about 10 microns. Zircon, and other materials which generate silica in situ during the high temperature firing of the block, may be a source of the colloidal silica.

When the block is made from the technical grade of chromic oxide without the addition of the ore, the preferred composition is from about 93% to about 98% chromic oxide, from about 1% to about 4% titania, and from about 1% to about 3% by weight of the colloidal silica. A particularly preferred block made from technical grade chromic oxide contains about 96% of said oxide and 2% of each of the titania and colloidal silica.

A large, dense refractory block is defined for the purposes of this invention as one having a volume of at least about 0.5 cubic foot (0.014 m³) and a density of from about 260 to about 320 pounds per cubic foot. A refractory block made by the method of this invention may be of any useful size or shape but the advantages of this invention are particularly beneficial in the formation of blocks as large as about 2 cubic feet (0.05 m³) such as, for example, one being 6 inches thick, 12 inches wide, and from 24 to 36 inches long. Blocks having right angled cut outs or an inside corner of about a one inch radius have been produced free of cracks by the method of this invention. A particularly advantageous feature of the blocks of this invention is the fact that their porosity may be as low as 0% although higher porosities may be achieved if desired.

The green block of this invention may be made in several ways. Slurrying of the chromic oxide, titania, and colloidal silica with water, an organic binder and an emulsifier, followed by spray drying and isostatic pressing is one way. Such a slurry may be slip cast in a plaster mold, also. Dampening of the oxide mixture with about 5 to 10% by weight of an aqueous binder solution and pressing at from 8000 to 12000 psi on a hydraulic press is another way. Firing of the green block may be carried out in either an oxidizing or a reducing atmosphere. The preferred temperature for firing is from about 2700° to about 3200° F.; firing in a reducing atmosphere at from about 2700° to about 2950° F. is especially preferred.

The invention is described in more detail by the procedures and products of the following examples.

EXAMPLE 1

To 248 pounds of water (about 29.8 gallons, 112.7 kg) there were added 6 pounds of Monsanto's Gelvatol 20-30 polyvinyl alcohol, 1.2 pounds of Poly G 600 polyethylene glycol (Olin Chemical Co.), 8.0 pounds of Darvan C polyelectrolyte surfactant (Vanderbilt Chemical Co., and a silicone defoamer. To this mixture were added 768 pounds of chromic oxide (Accrox C; average particle size=4.1 microns, sold by American Chrome and Chemicals), 16 pounds of titania (Titanox 1070; NL Industries), and 16 pounds of colloidal silica (Cab-O-Sil M-5, surface area=200±25 m$^2$/g). The solids were blended together by vigorous mixing of the aqueous slurry so that upon spray drying of the slurry a substantially uniform granular refractory material was obtained. A mold sized to yield a 6"×12"×24" finished block (12.2×30.4×60.8 cm) was filled with the granules and evacuated. Green block was formed by isostatic pressing at 20,000 psi. and it was set on its 6×24 face in a kiln and fired at 2950° F. for 10 hours after the kiln was heated according to the following schedule:

| | |
|---|---|
| Ambient to 450° F. | 20° F/hr. |
| Soaked at 450° F. | 2 hrs. |
| 450° F. to 1200° F. | 20° F./hr. |
| 1200° F. to 1600° F. | 40° F./hr. |
| 1600° F. to 2950° F. | 20° F./hr. |

The kiln atmosphere was maintained in the range of 0.5 to 1.5% excess combustibles after the temperature reached 1600° F. After cooling the block to ambient temperature again in the kiln, it was inspected and measured. Apparent porosity and bulk density of the fired refractory was determined from measurements of a 3"×3"×9" bar of the refractory material which sat atop the block during firing.

The green density of the block was 203 lbs/cu ft (3250 kg/m$^3$) and the fired density was about 293 lbs/cu ft (4688 kg/m$^3$). Despite shrinkage of the block during firing which amounted to 10.76%, 12.73%, and 10.56% in the length, width and thickness dimensions, respectively, no cracks were found in the finished block. An average of 3 measurements of the bar gave a bulk density of 294 lbs/cu ft and an apparent porosity of 0.0%.

In contrast to the above results, a block made in the same way except that the silica had a surface area of 21 m$^2$/g (Reynolds Aluminum Co.) and fired at the same time in the same kiln was found to be cracked upon inspection.

The glass corrosion resistance of the block of Example 1 was tested by suspending lengthwise four rectangular test bars cut from the block in each of three different baths of molten glass contained in platinum crucibles. The surface of the molten glass in each case was maintained at about 1.25 inches (31.8 mm) above the lower end of the test bar. The first set of four bars was held in the molten glass at 2650° F. for 348 hours. The second set was held in the bath for 692.5 hours. The third set was held in the molten glass bath at 2700° F. for 648 hours. After removal of the molten glass from the crucibles and cooling of the test bars, the extent of corrosion of the bars was measured at the glass line, i.e. where the surface of the glass had met the faces of the bar, and at 17.5 mm below the glass line. The difference in the width of the faces of the bars before and after the tests, called the "cut", was recorded and the service life of the refractory was calculated using the formula:

$$\frac{\text{Test time (hrs.)} \times 25.4 \text{ mm}}{24 \text{ hrs} \times \text{cut (mm)}} = \text{Days to cut 1 inch.}$$

The average number of days to cut 1 inch at the glass line, based on measurements of the twelve test bars, was 440. Measurements of the bars below the glass line, when plugged into the above formula and the results averaged, indicated that it would take 515 days of submersion in molten glass to cause a loss of 1 inch of refractory by corrosion under the glass line.

EXAMPLE 2

A refractory block which was fired at the same time in the same kiln as that of Example 1 was prepared by the general procedure of that example except that the chromic oxide had an average particle size of 2.3 microns, only 204 pounds of slurry water were used and the mold was not evacuated before being closed. The block did not crack during firing or cooling even though shrinkage was greater in each dimension.

EXAMPLE 3

A green block having a density of 196 pounds per cubic foot and a bar were made by the general procedure of Example 1 and fired according to the schedule in that example but an atmosphere containing from ⅛ to ¼ percent excess oxygen was maintained in the kiln after the temperature reached 1600° F. The block had no cracks despite shrinkages of 12.04%, 14.35%, and 13.05% in the length, width, and thickness, respectively. The bulk density, as measured on the bar was 300 pounds/cu ft (4.8 g/cc) and the apparent porosity was 0.0%.

EXAMPLE 4

The general procedure of Example 1 was followed to make a 6"×12"×24" block and a bar but a colloidal silica sol (Ludox HS-40; specific surface area=230 m$^2$/g) was used in place of the fumed silica to make a slurry having the same solids content. The soaking period at 450° F. was also omitted from the firing schedule and the excess combustibles atmosphere was maintained above 1500° F. The finished block was not cracked and shrinkage in the length dimension was 13.3%. The bulk density of the bar was 309 lbs/cu. ft. (4.95 g/cm$^3$) and the apparent porosity was 0.0%.

EXAMPLE 5

The general procedure of Example 1 was followed to make a bar measuring 3"×3"×9". Exceptions to that procedure were: the technical grade chromic oxide (about 98% pure) had an average particle size of 0.8 micron and it constituted only 71.1% of the dry weight of the mixture; 25.3% of the dry mixture was the low silica chromite described above and having an average particle size of 5 microns; the fumed silica constituted 1.55% of the dry mixture; and the slurry contained 28% water, 0.74% of the polyvinyl alcohol, 0.13% of the glycol, and 1.3% of the surfactant, by weight. The bulk density of the bar was 274 lbs. per cubic foot and the apparent porosity was 0%. Shrinkage upon firing was 11.7%.

EXAMPLE 6

A large block measuring 6"×12"×24" and a 3"×3"×9" bar were made according to the general procedure of Example 5 except that the technical grade chromic oxide had an average particle size of 2 microns. The bulk density and apparent porosity of the bar were 272 pounds per cubic foot and 2.4%, respectively. No cracks were observed in the cooled block even though the firing shrinkage was 11.9% in length, 12.3% in width, and 11.4% in thickness.

The subject matter claimed is:

1. A refractory material comprising, by weight, from about 80% to about 98% chromic oxide, from about 1% to about 4% titania, and from about 1% to about 3% of a colloidal silica having a specific surface area of at least about 90 $m^2/g$.

2. The material of claim 1 wherein the silica has an average particle size of from about 7 to about 24 nanometers.

3. The material of claim 1 wherein the chromic oxide has an average particle size greater than 1 micron.

4. The material of claim 1 wherein the chromic oxide has an average particle of from about 2 to about 10 microns.

5. The material of claim 1 wherein it comprises from 0% to about 8% alumina, from 0% to about 5% ferric oxide, and from 0% to about 5% magnesia, by weight.

6. The material of claim 1 wherein the chromic oxide is from about 93% to about 98%, the titania is from about 1% to about 4%, and the colloidal silica is from about 1% to about 3%.

7. The material of claim 1 wherein the colloidal silica and the titania are each about 2%.

8. A refractory block comprising the material of claim 1 and having a density of from about 260 to about 320 pounds per cubic foot.

9. The refractory block of claim 9 characterized further by a porosity as low as 0%.

10. The refractory block of claim 8 further characterized in that its volume is at least about 0.5 cubic foot.

11. The block of claim 10 wherein the volume is from about 0.5 to about 2 cubic feet.

12. A method for forming a refractory block comprising mixing, by weight, from about 80% to about 98% chromic oxide, from about 1% to about 4% titania, and from about 1% to about 3% of a colloidal silica having a specific surface area of at least about 90 $m^2/g$, pressing the mixture into a block, and firing the block at a temperature of from about 2600° F. to about 3200° F.

13. The method of claim 12 wherein the firing is conducted in a reducing atmosphere.

14. The method of claim 12 wherein the firing is conducted in an oxidizing atmosphere.

15. The method of claim 10 wherein the mixture contains from about 93% to about 98% chromic oxide, from about 1% to about 4% titania, and from about 1% to about 3% colloidal silica of the weight of the solids.

16. The method of claim 12 wherein a portion of the chromic oxide is present as a chromite ore.

* * * * *

UNITED STATES PATENT AND TRADEMARK OFFICE
CERTIFICATE OF CORRECTION

PATENT NO. : 4,724,224
DATED : February 9, 1988
INVENTOR(S) : Walter G. Staley, Jr. and Roy R. Ramey It is certified that error appears in the above—identified patent and that said Letters Patent is hereby corrected as shown below: Title Page:

IN THE TITLE: "CHRONIC" should read --CHROMIC--.

IN THE SPECIFICATION:

Column 1, lines 34-35, "aa an aid" should read --as an aid--.

Column 2, line 27, "in situ" should read --*in situ*--.

Column 6, claim 9, line 8, "of claim 9" should read --of claim 8--.

Column 6, claim 15, line 25, "of claim 10" should read --of claim 12--.

Signed and Sealed this

Thirteenth Day of December, 1988

Attest:

DONALD J. QUIGG

*Attesting Officer*   *Commissioner of Patents and Trademarks*